US012414206B2

(12) United States Patent
Ge et al.

(10) Patent No.: US 12,414,206 B2
(45) Date of Patent: Sep. 9, 2025

(54) LATCH SYSTEM FOR MICROWAVE OVEN DOOR

(71) Applicant: WHIRLPOOL CORPORATION, Benton Harbor, MI (US)

(72) Inventors: Dick Ge, Shenzhen (CN); Ryan Li, Shenzhen (CN); Fly Xie, Shenzhen (CN); Troy Zhou, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 595 days.

(21) Appl. No.: 17/732,961

(22) Filed: Apr. 29, 2022

(65) Prior Publication Data

US 2023/0354485 A1 Nov. 2, 2023

(51) Int. Cl.
*H05B 6/64* (2006.01)

(52) U.S. Cl.
CPC .................................. *H05B 6/6417* (2013.01)

(58) Field of Classification Search
CPC ....... H05B 6/64; H05B 6/6414; H05B 6/6417
See application file for complete search history.

(56) References Cited

U.S. PATENT DOCUMENTS 4,321,445 A * 3/1982 Kristof ................. H05B 6/6417 219/722
4,450,335 A 5/1984 Shimizu et al.
4,542,269 A 9/1985 Sakoda
4,825,027 A 4/1989 Yoon
4,875,721 A * 10/1989 Okamoto .................. E05C 9/02 292/29
4,982,063 A 1/1991 Tsunekawa et al.

FOREIGN PATENT DOCUMENTS

| | | | |
|---|---|---|---|
| JP | S5087545 U | | 7/1975 |
| JP | S5163245 U | | 5/1976 |
| JP | S5974434 A | | 4/1984 |
| KR | 100273874 B1 | * | 12/2000 |

* cited by examiner

*Primary Examiner* — Hung D Nguyen
(74) *Attorney, Agent, or Firm* — Brooks Kushman P.C.

(57) ABSTRACT

A microwave oven includes a housing, a door, and a latch. The housing defines a first internal cavity configured to receive food. The door is rotatably secured to the housing, defines a second internal cavity, and has a handle. The door is configuring to pivot relative to the housing to transition the door between an open position and a closed position. The latch is disposed within the second internal cavity. The latch has a hook and a push button. The hook protrudes outward from second internal cavity and toward the housing. The hook is configured to engage and disengage the housing to lock and unlock the door to and from the housing, respectively. The push button is rigidly interconnected with the hook. The hook is configured to disengage the housing in response to depression of the push button.

20 Claims, 5 Drawing Sheets

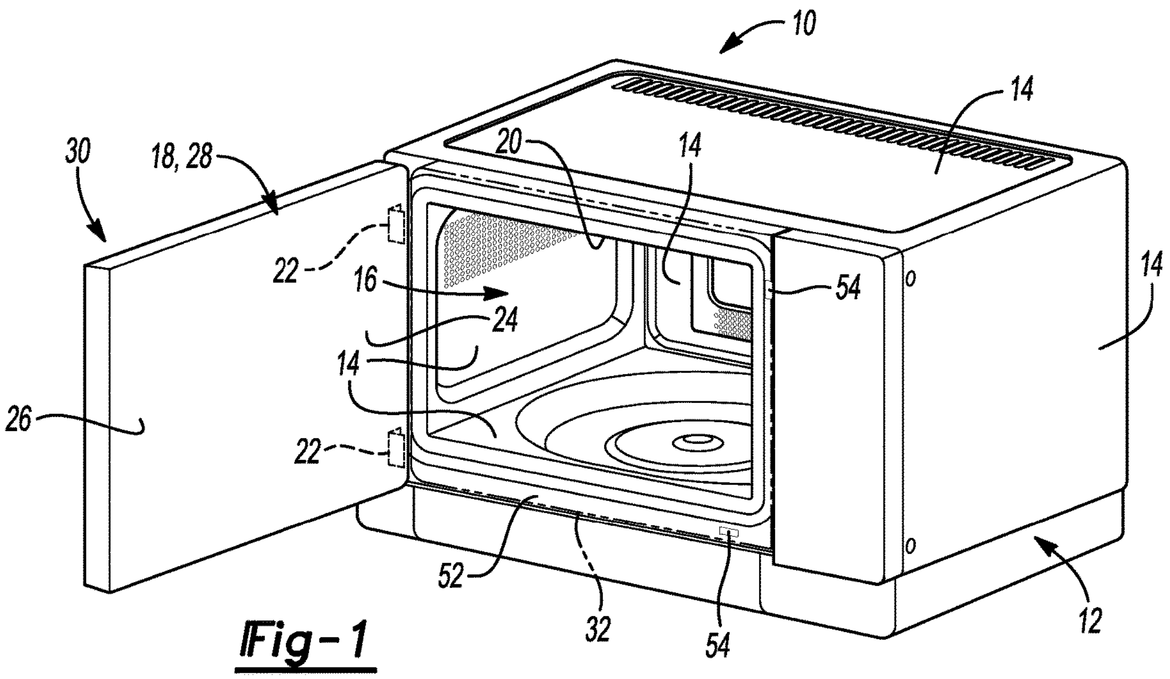
Fig-1
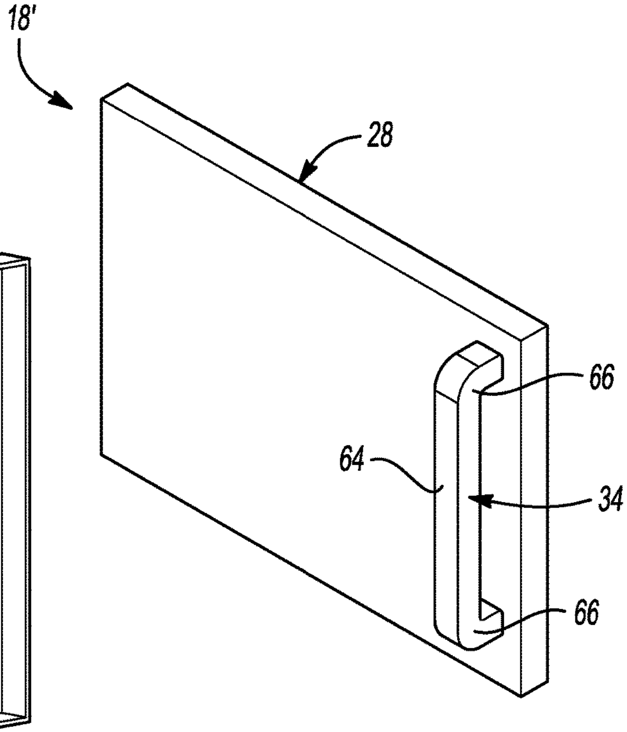
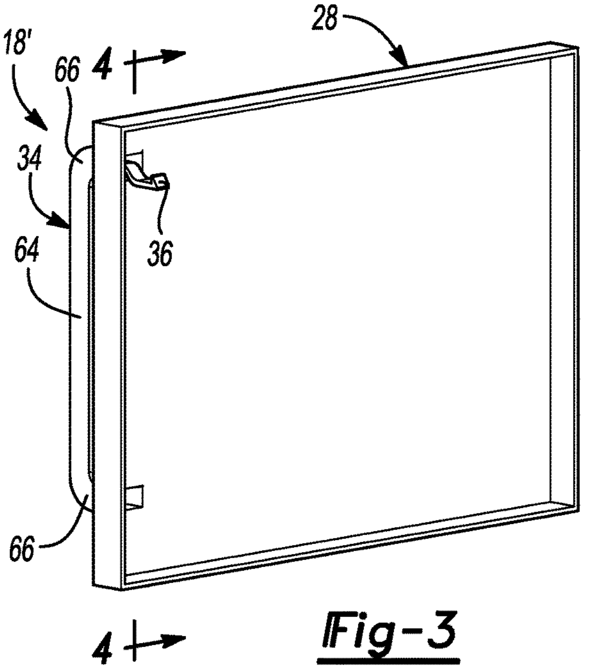
Fig-3
Fig-2

LATCH SYSTEM FOR MICROWAVE OVEN DOOR

TECHNICAL FIELD

The present disclosure relates to an appliance that is configured to cook food, such as a microwave oven.

BACKGROUND

Microwave ovens may include doors that are rotatably secured to main portions of the microwave ovens.

SUMMARY

A microwave oven includes a housing, a door, and a latch. The housing defines an internal cavity configured to receive food for cooking and an opening configured to provide access to the internal cavity. The door is rotatably secured to the housing, has external panels defining an internal pocket, and has a handle. The door is configuring to pivot relative to the housing in response to a user engaging the handle to transition the door between an open position and a closed position. The door provides access to the opening in the open position and covers the opening in the closed position. The latch is pivotably secured to the door within the internal pocket and configured to pivot about an axis relative to the door. The latch has a latch hook and a push button. The latch hook protrudes outward from the internal pocket along a first of the external panels and extends toward the housing. The latch hook is configured to engage the housing to lock the door to the housing in the closed position and is configured to disengage the housing to unlock the door from the housing. The first of the external panels faces toward the housing. The push button protrudes outward from the handle and is rigidly interconnected to the latch hook within the internal pocket. The push button and the latch hook are configured to collectively pivot about the axis in response to depression of the push button to disengage the latch hook from the housing.

A microwave oven includes a housing, a door, and a latch. The housing defines a first internal cavity configured to receive food for cooking. The door has a panel rotatably secured to the housing and a handle protruding outward from the panel. The door is configuring to pivot relative to the housing to transition the door between an open position and a closed position. The door provides access to the first internal cavity in the open position and covers the first internal cavity in the closed position. The panel and the handle collectively define a second internal cavity. The latch is disposed within the second internal cavity. The latch has a hook and a push button. The hook protrudes outward from the second internal cavity, through the panel, and toward the housing. The hook is configured to engage the housing to lock the door to the housing in the closed position and is configured to disengage the housing to unlock the door from the housing. The push button protrudes outward from the handle and is rigidly interconnected to the hook within the second internal cavity. The hook is configured to disengage the housing in response to depression of the push button.

A microwave oven includes a housing, a door, and a latch. The housing defines a first internal cavity configured to receive food for cooking. The door is rotatably secured to the housing, defines a second internal cavity, and defines a pocket handle extending upward from a lower edge. The door is configuring to pivot relative to the housing to transition the door between an open position and a closed position. The door provides access to the first internal cavity in the open position and covers the first internal cavity in the closed position. The latch is disposed within the second internal cavity. The latch has a hook and a push button. The hook protrudes outward from the second internal cavity, beyond and external surface of the door, and toward the housing. The hook is configured to engage the housing to lock the door to the housing in the closed position and is configured to disengage the housing to unlock the door from the housing. The push button extends downward into the pocket handle and is rigidly interconnected to the hook within the second internal cavity. The hook is configured to disengage the housing in response to depression of the push button.

BRIEF DESCRIPTION OF THE DRAWINGS

FIG. 1 is a front isometric view of a microwave oven;

FIG. 2 is a front isometric view of a first embodiment of a door for the microwave oven;

FIG. 3 is a rear isometric view of the first embodiment of the door for the microwave oven;

DETAILED DESCRIPTION

Figure 4:
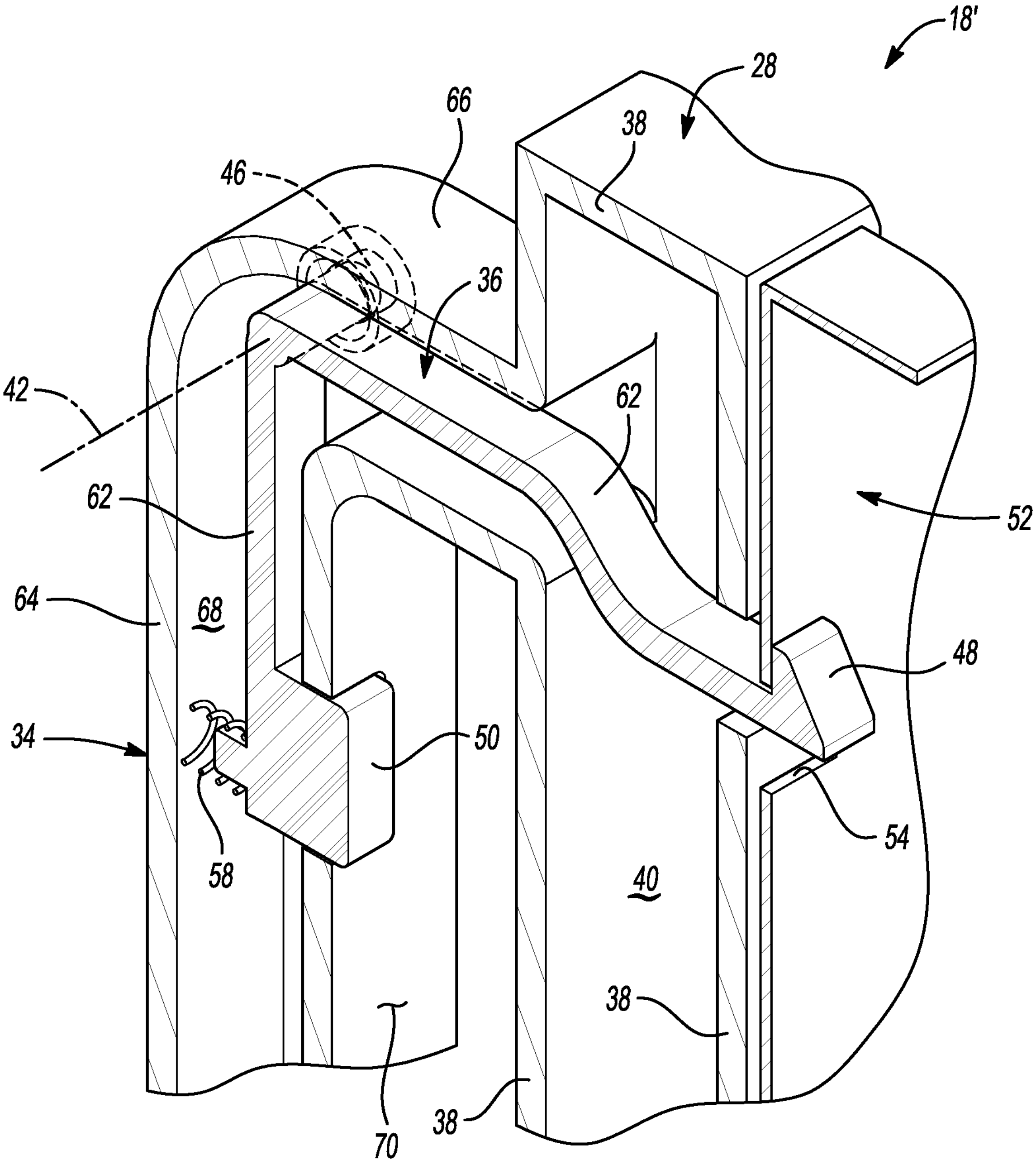
FIG. 4 is a cross-sectional view taken along line 4-4 in FIG. 3.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a front isometric view of a microwave oven 10 is illustrated. The microwave oven 10 includes a housing 12. The housing includes a plurality of panels or walls 14 that define an internal cavity 16 in which food may be placed or received for cooking. The plurality of walls 14 may include a top wall, a bottom wall, and three side walls. The housing 12 may further define an opening 20 configured to provide access to the internal cavity 16. The microwave oven 10 also includes a door 18 that is rotatably attached or secured to the to the housing 12. For example, the door 18 may be rotatably secured or attached to the housing 12 via hinges 22 along a first end or first side 24 of the door 18.

A handle (not shown in FIG. 1) may be secured to or defined along a second end or second side 26 of the door 18. The door 18 may comprise a panel 28 and said handle, where the panel 28 may be rotatably secured or attached to the housing 12 via the hinges 22. More specifically, the panel 28 may be comprised of a plurality of plates, external panels, or subpanels that are secured to each other and define an internal pocket or cavity (not shown in FIG. 1). For example, the panel 28 may comprise a plurality of metal plates or sheet metal subpanels that are secured to each other and define an internal pocket or cavity. The door 18 is configuring to pivot relative to the housing 12 via the hinges 22 in response to a user engaging the handle to transition the door between an open position 30 and a closed position 32. The door 18 provides access to the opening 20 and internal cavity 16 when in the open position 30. The door 18 covers the opening 20 and internal cavity 16 when in the closed position 32. The door 18 may be one of several embodiments described in further detail below. Therefore, the door 18 as illustrated in FIG. 1 should not be construed as limiting.

Figure 5:
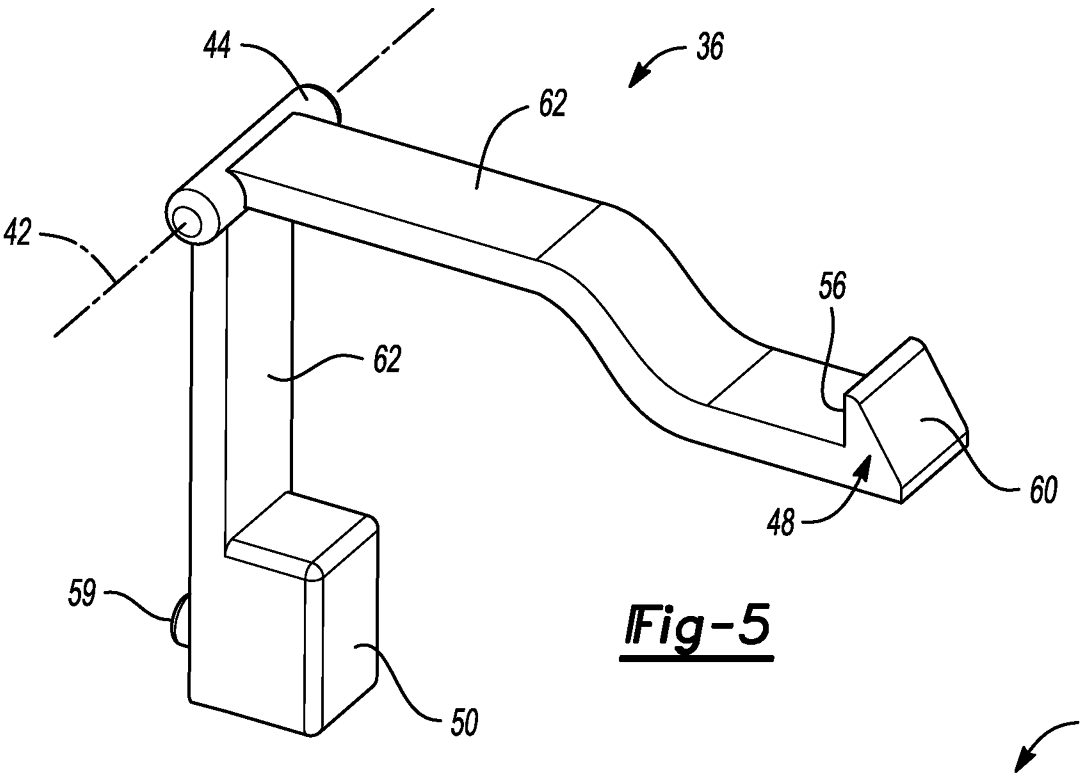
FIG. 5 is a front isometric view of a first embodiment of a latch for the microwave oven door.
Figure 6:
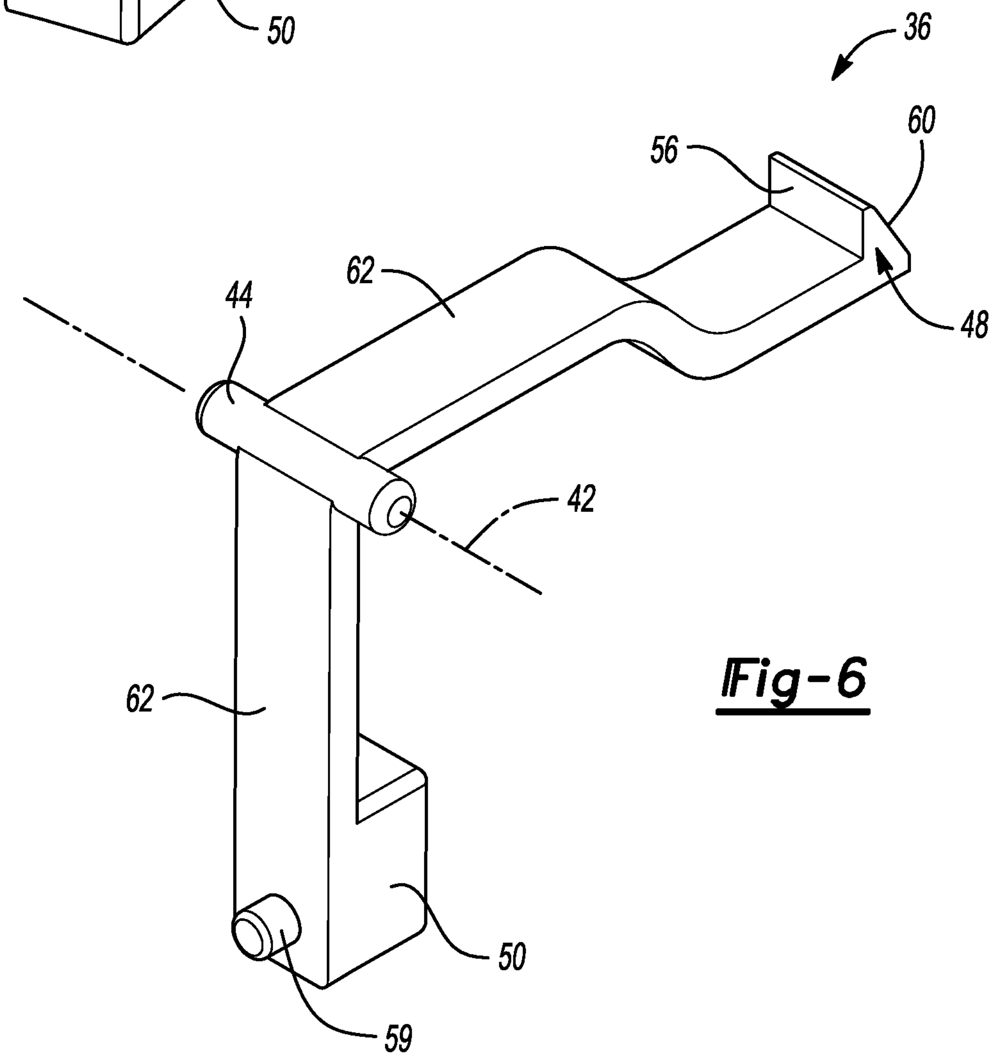
FIG. 6 is a rear isometric view of the first embodiment of the latch for the microwave oven door.

Referring to FIG. 2-6, a first embodiment of the door 18' and a corresponding latching system for the door 18' are illustrated. The door 18' includes the panel 28 and a handle 34 protruding outward from the panel 28. The door 18' also includes a latch 36 that protrudes outward from the panel 28 along an opposing side of the panel 28 relative to the handle 34. As previously stated, the panel 28 may more specifically be comprised of a plurality of plates, external panels, or subpanels 38 that are secured to each other and define an internal cavity or pocket 40. The handle 34 may protrude outward from a first of the subpanels 38 that faces away from the housing 12 while the latch 36 may protrude outward from a second of the subpanels 38 that faces toward the housing 12.

The latch 36 is disposed within the internal pocket 40. The latch 36 is pivotably secured to the door 18' within the internal pocket 40 and is configured to pivot about an axis 42 relative to the door 18'. More specifically, the latch 36 may include a pivot pin 44 about which the latch 36 pivots relative to the door 18'. Each end of the pivot pin 44 may be disposed within a bushing hole or orifice 46 defined by the door 18' internally within the internal pocket 40. The pivot pin 44 may be rotatable about the axis 42 within the bushing holes or orifices 46. The latch 36 includes a latch hook 48 and a push button 50.

The latch hook 48 protrudes outward from the internal pocket 40 along one of the external panels 38 and extends toward the housing 12. The latch hook 48 also extends beyond an external surface of the door 18'. More specifically, the latch hook 48 extends toward a front panel 52 of the housing 12. The latch hook 48 is configured to engage the housing 12 to lock the door 18' to the housing 12 in the closed position 32. More specifically, the latch hook 48 is configured to extend through a notch, groove, or slot 54 defined by the front panel 52 of the housing 12 and a flat stopping surface 56 that extends upward along aback side of the latch hook 48 is configured to engage a backside of the front panel 52 to lock the door 18' to the housing 12 in the closed position 32. A spring 58 may bias the latch hook 48 upward so that the flat stopping surface 56 is aligned with the backside of the front panel 52 when the latch hook 48 is extended through the slot 54, and so that the door 18' automatically remains locked to the housing 12 when the door 18' is in the closed position 32. The latch 36 may include a protrusion 59 that functions to retain the spring 58 so that spring 58 remains in contact with the latch 36. The spring 58 may engage both the latch 36 and an internal surface within the door 18', or more specifically an internal surface within the handle 34.

The latch hook 48 is configured to disengage the housing 12 to unlock the door 18' from the housing 12. More specifically, to unlock the door 18' from the housing 12 while the door 18' is in the closed position 32, the latch hook 48 is rotated downward via the pivot pin 44 so that the flat stopping surface 56 is no longer aligned with the backside of the front panel 52 but is instead aligned with the slot 54 defined by the front panel 52 of the housing 12. Once the flat stopping surface 56 is aligned with the slot 54 the door 18' may freely transition between the open position 30 and the closed position 32.

The latch hook 48 may be rotated downward via the pivot pin 44 so that the flat stopping surface 56 is aligned with the slot 54 by depressing the push button 50. The push button 50 may be rigidly interconnected to the latch hook 48 within the internal pocket 40. The push button 50 and the latch hook 48 are configured to collectively pivot via the pivot pin 44 about the axis 42 in response to depression of the push button 50 to disengage the latch hook 48 from the housing 12 (e.g., to align flat stopping surface 56 with the slot 54) in order to unlock the door 18' from the housing 12. The latch hook 48 may also include a ramped surface 60. The ramped surface 60 may engage the front panel 52 of the housing 12 proximate to or within the slot 54 while the door 18' is being transitioned to the closed position 32 so that the latch hook 48 is forced downward, allowing the latch hook 48 to extend through the slot 54 without the push button 50 being depressed. Once the latch hook 48 is beyond the slot 54, the latch hook 48 is forced upward via the spring 58 to lock the door 18' to the housing 12 in the closed position 32. The ramping surface 60 allows the door 18' to transition to the closed position 32 and automatically lock without depressing the push button 50.

Rigidly interconnected may refer to components that are connected or secured to each other such that relative positions of the components to each other remain the same, particularly under operating conditions. For example, if the position of a first component is changed, the position of a second components that is rigidly interconnected with the first component will also change so that the relative positions of the first and second components to each other remain the same. Multiple components formed as a single solid piece are rigidly interconnected. Multiple components secured to each other without moveable joints are rigidly interconnected. Relative positions of rigidly interconnected components may be considered to remain the same in the event minor deflections of the components occur when external forces are applied to the components, so long as such minor deflections do not affect the functionality of the components. Such minor deflections may include deflections that are not detectable or observable by a person.

The push button 50 protrudes outward from the handle 34. More specifically, the push button 50 extends outward from the handle 34 through a notch, groove, or slot defined by the handle 34. The latch 36 includes a plurality of linking arms 62 rigidly interconnecting the latch hook 48 to the push button 50. The latch hook 48, push button 50, and plurality of linking arms 62 may form a single solid component. At least two of the plurality of linking arms 62 are non-linear relative to each other. A first and a second of the linking arms 62 may be substantially perpendicular to each other. Substantially perpendicular may refer to any incremental angle is that is between exactly perpendicular and 15° from exactly perpendicular.

The handle 34 may be C-shaped. The handle 34 may have a central portion 64 that is spaced-apart from the panel 28. More specifically, the central portion 64 may be spaced apart from the first of the subpanels 38 that faces away from the housing 12. The handle 34 may also have opposing ends 66 that are each secured to the panel 28. More specially, the opposing ends 66 may each be secured to the first of the subpanels 38 that faces away from the housing 12.

The handle 34 may define an internal channel 68 that is in communication within the in the internal pocket 40. The internal channel 68 may also be said to form a portion of the internal pocket 40. The push button 50 is rigidly interconnected to the latch hook 48 via the linking arms 62, which extend through the internal channel 68 and/or the internal pocket 40. The push button 50 more specifically may protrude outward from an external surface 70 of the central portion 64 of the handle 34. The external surface 70 may be one any of the external surfaces of the handle 34, but may more specifically be the external surface of the central portion 64 of the handle 34 that faces toward the panel 28. More specially, the external surface 70 may face the first of the subpanels 38 that faces away from the housing 12.

Figure 7:
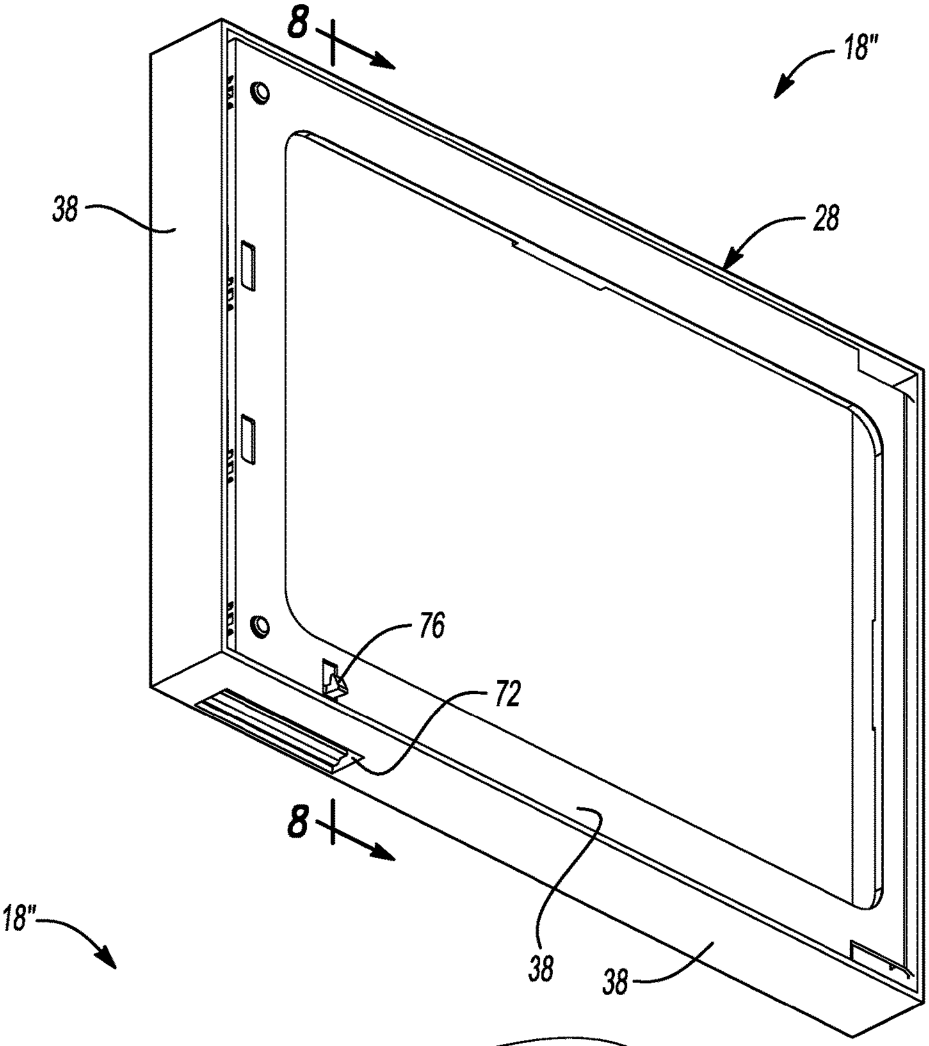
FIG. 7 is a lower rear isometric view of a second embodiment of the door for the microwave oven.
Figure 8:
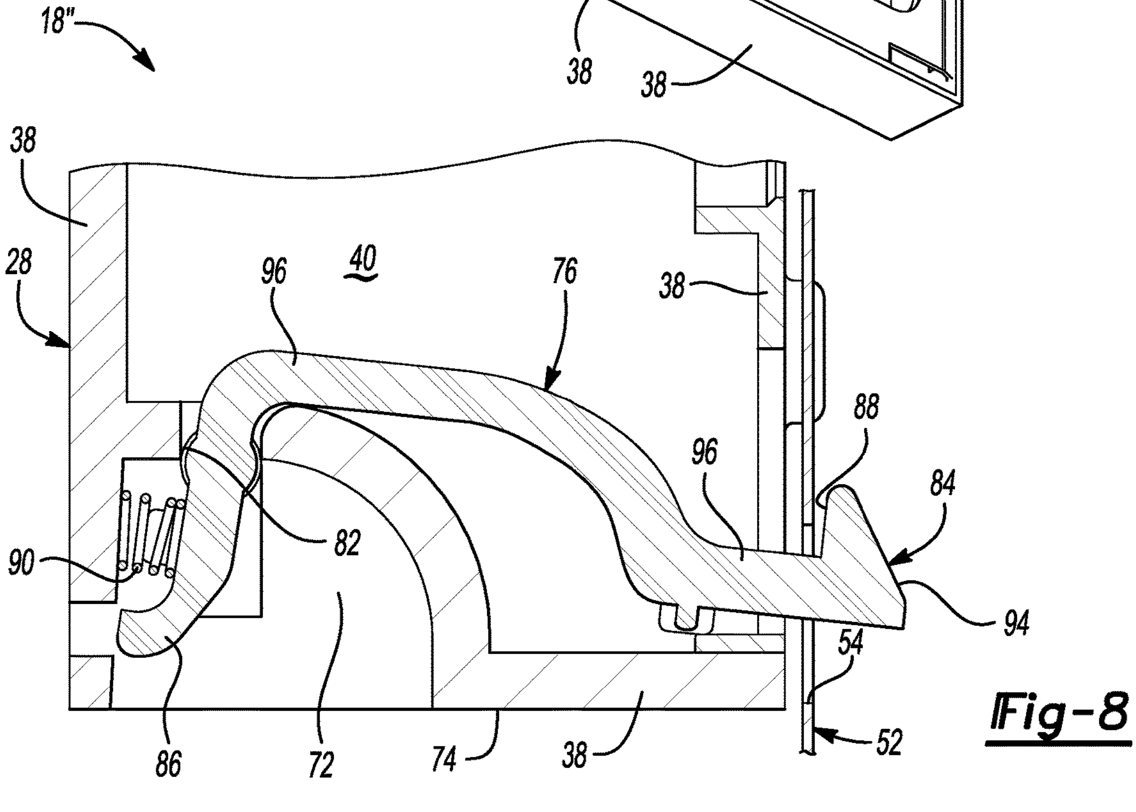
FIG. 8 is a cross-sectional view taken along line 8-8 in FIG. 7.
Figure 9:
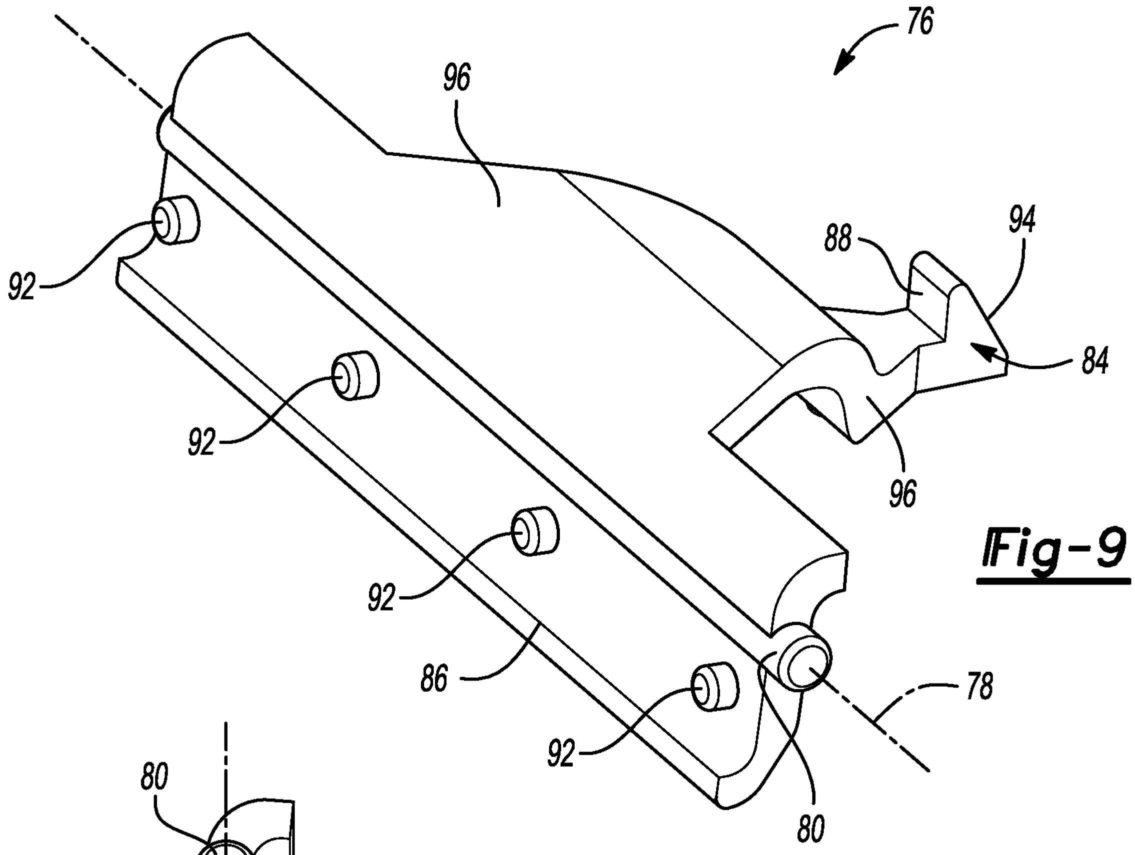
FIG. 9 is a top isometric view of a second embodiment of a latch for the microwave oven door.
Figure 10:
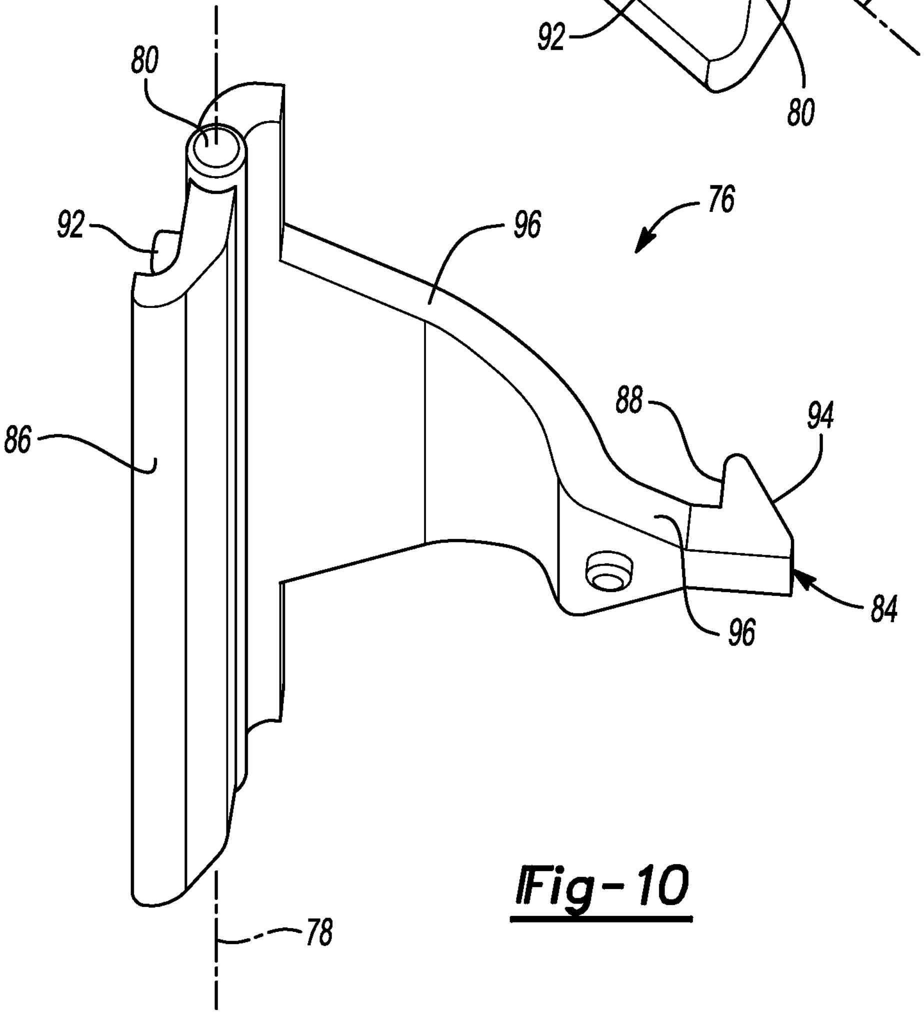
FIG. 10 is a bottom isometric view of the second embodiment of the latch for the microwave oven door.

Referring to FIG. 7-10, a second embodiment of the door 18" and a corresponding latching system for the door 18" are illustrated. The door 18" includes the panel 28 and defines a pocket handle 72 along a lower or bottom edge 74 of the door 18". The door 18" also includes latch 76 that protrudes outward from the panel 28. As previously stated, the panel 28 may more specifically be comprised of a plurality of plates, external panels, or subpanels 38 that are secured to each other and define an internal cavity or pocket 40.

The latch 76 is disposed within the internal pocket 40. The latch 76 is pivotably secured to the door 18" within the internal pocket 40 and is configured to pivot about an axis 78 relative to the door 18". More specifically, the latch 36 may include a pivot pin 80 about which the latch 76 pivots relative to the door 18". Each end of the pivot pin 80 may be disposed within a bushing hole or orifice 82 defined by the door 18" internally within the internal pocket 40. The pivot pin 80 may be rotatable about the axis 78 within the bushing holes or orifices 82. The latch 76 includes a latch hook 84 and a push button 86.

The latch hook 84 protrudes outward from the internal pocket 40 along one of the external panels 38 and extends toward the housing 12. The latch hook 84 also extends beyond an external surface of the door 18". More specifically, the latch hook 84 extends toward the front panel 52 of the housing 12. The latch hook 84 is configured to engage the housing 12 to lock the door 18" to the housing 12 in the closed position 32. More specifically, the latch hook 84 is configured to extend through the notch, groove, or slot 54 defined by the front panel 52 of the housing 12 and a flat stopping surface 88 that extends upward along aback side of the latch hook 48 is configured to engage a backside of the front panel 52 to lock the door 18" to the housing 12 in the closed position 32. One or more springs 90 may bias the latch hook 84 upward so that the flat stopping surface 88 is aligned with the backside of the front panel 52 when the latch hook 84 is extended through the slot 54, and so that the door 18" automatically remains locked to the housing 12 when the door 18" is in the closed position 32. The latch 76 may include protrusions 92 that function to retain the springs 90 so that springs 90 remain in contact with the latch 76. The springs 90 may engage both the latch 76 and an internal surface within the door 18", or more specifically an internal surface within the pocket handle 72.

The latch hook 84 is configured to disengage the housing 12 to unlock the door 18" from the housing 12. More specifically, to unlock the door 18" from the housing 12 while the door 18" is in the closed position 32, the latch hook 84 is rotated downward via the pivot pin 80 so that the flat stopping surface 88 is no longer aligned with the backside of the front panel 52 but is instead aligned with the slot 54 defined by the front panel 52 of the housing 12. Once the flat stopping surface 88 is aligned with the slot 54 the door 18" may freely transition between the open position 30 and the closed position 32.

The latch hook 84 may be rotated downward via the pivot pin 80 so that the flat stopping surface 88 is aligned with the slot 54 by depressing the push button 86. The push button 86 may be rigidly interconnected to the latch hook 84 within the internal pocket 40. The push button 86 and the latch hook 84 are configured to collectively pivot via the pivot pin 80 about the axis 78 in response to depression of the push button 86 to disengage the latch hook 84 from the housing 12 (e.g., to align flat stopping surface 88 with the slot 54) in order to unlock the door 18" from the housing 12. Depression of the push button 86 may include pulling the push button 86 in a direction away from the housing 12. The latch hook 84 may also include a ramped surface 94. The ramped surface 94 may engage the front panel 52 of the housing 12 proximate to or within the slot 54 while the door 18" is being transitioned to the closed position 32 so that the latch hook 84 is forced downward, allowing the latch hook 84 to extend through the slot 54 without the push button 86 being depressed. Once the latch hook 84 is beyond the slot 54, the latch hook 84 is forced upward via the one or more springs 90 to lock the door 18" to the housing 12 in the closed position 32. The ramping surface 94 allows the door 18" to transition to the closed position 32 and automatically lock without depressing the push button 86.

The push button 86 extends downward from the internal pocket 40 and into the pocket handle 72. More specifically, the push button 86 extends downward into pocket handle 72 through a notch, groove, or slot defined by an internal surface within the pocket handle 72. The latch 76 includes a plurality of linking arms 96 rigidly interconnecting the latch hook 84 to the push button 86. The latch hook 84, push button 86, and plurality of linking arms 96 may form a single solid component. At least two of the plurality of linking arms 96 may be non-linear relative to each other.

The microwave oven 10 may include a microwave generating device, such as a magnetron or a solid-state device. The microwave oven 10 may include a waveguide that defines a pathway or channel on an opposing side of a wall of the plurality of walls 14 relative to the internal cavity 16. The wall of the plurality of walls 14 may define an orifice that establishes communication between the internal cavity 16 and the pathway or channel. A waveguide cover may be disposed over the orifice within the internal cavity 16. The pathway or channel of the waveguide is configured to direct microwaves from the microwave generating device, through the waveguide cover, and to the internal cavity 16 in order to cook any food that is disposed within the internal cavity 16.

The microwave oven 10 may also include a power supply, such as a transformer, that provides electrical power to the microwave generating device, a capacitor, and a cooling fan. The cooling fan may be configured to cool the various components of the microwave oven 10, such as the microwave generating device, power supply, capacitor, etc. Please note that for illustrative purposes, the electrical connections between the various components of the microwave oven 10 and the electrical connection between the microwave 10 and an external power source (e.g., an electrical plug and outlet connection) are not shown.

The electronic components (e.g., microwave generating device, fan motors, power supply, capacitors, etc.) of the microwave oven 10 may be connected to a control panel, such as a human machine interface (HMI), and a controller, so that an operator may control various parameters. For example, the operator may be configured to input a cooking time, a cooking temperature, a desired mode of cooking (e.g., microwave cooking, defrost, etc.).

The controller may be part of a larger control system and may be controlled by various other controllers throughout the microwave oven 10. It should therefore be understood that the controller and one or more other controllers can collectively be referred to as a "controller" that controls various functions or components of the microwave oven 10 in response to signals from various sensors to control the various functions or components of the microwave oven 10. The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the microwave oven 10.

It should be understood that any component having a callout number that includes one or prime symbols (') should be construed as having the same structure, subcomponents, and functionality as a component that includes the same callout number but without the one or prime symbols, unless otherwise stated or illustrated herein. It should also be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A microwave oven comprising:

a housing defining (i) an internal cavity configured to receive food for cooking and (ii) an opening configured to provide access to the internal cavity;

a door (i) rotatably secured to the housing, (ii) having external panels defining an internal pocket, and (iii) having a handle, wherein the door (i) is configuring to pivot relative to the housing in response to a user engaging the handle to transition the door between an open position and a closed position, (ii) provides access to the opening in the open position, and (iii) covers the opening in the closed position; and a latch (i) pivotably secured to the door within the internal pocket and (ii) configured to pivot about an axis relative to the door, the latch having a latch book (i) protruding outward from the internal pocket along a first of the external panels, (ii) extending toward the housing. (iii) configured to engage the housing to lock the door to the housing in the closed position, and (iv) configured to disengage the housing to unlock the door from the housing, where the first of the external panels faces toward the housing, and push button (i) protruding outward from the handle and (ii) rigidly interconnected to the latch hook within the internal pocket to maintain relative positions between the push button and the lack hook, wherein the push button and the latch. hook are configured to collectively pivot about the axis while maintaining the relative positions in response to depression of the push button to disengage the latch hook from the housing.

2. The microwave oven of claim 1, wherein the latch includes a plurality of linking arms rigidly interconnecting the latch hook to the push button.

3. The microwave oven of claim 2, wherein the latch hook, push button, and plurality of linking arms form a single solid component.

4. The microwave oven of claim 2, wherein at least two of the plurality of linking arms are non-linear relative to each other.

5. The microwave oven of claim 1, wherein the handle (1) is C-shaped, (ii) has a central portion that is spaced-apart from a second of the external panels such that a space is defined between the central portion and the second of the external panels and (in) bas opposing ends each secured to the second of the external panels, wherein the second of the external panels faces away from the housing.

6. The microwave oven of claim 5, wherein the handle definies an internal channel that is in communication with the internal pocket, and wherein the push button is rigidly interconnected with the latch hook via first and second linking arms extending through the internal channel and the internal pocket.

7. The microwave oven of claim 6, wherein the first and second linking arms are substantially perpendicular to each other.

8. The microwave oven of claim 5, wherein the push button protrudes outward from an external surface of the central portion of the handle and into the space.

9. The microwave oven of claim 8, wherein the external surface faces toward the space and the second of the external panels of the door.

10. The microwave oven of claim 1, wherein the handle is a pocket handle defined along a bottom edge of the door.

11. The microwave oven of claim 10, wherein the push button is disposed within the pocket handle.

12. A microwave oven comprising:

a housing defining a first internal cavity configured to receive food for cooking;

a door having (i) a panel rotatably secured to the housing and (ii) a handle protruding outward from the panel, wherein the door (i) is configuring to pivot relative to the housing to transition the door between an open position and a closed position, (ii) provides access to the first internal cavity in the open position, (ii) covers the first internal cavity in the closed position, and wherein the panel and the handle collectively define a second internal cavity; and a latch disposed within the second internal cavity, the latch having a hook (i) protruding outward from the second internal cavity, through the panel, and toward the housing, (ii) configured to engage the housing to lock the door to the housing in the closed position, and (iii) configured to disengage the housing to unlock the door from the housing, and a push button (i) protruding outward from the handle and (ii) rigidly interconnected to the hook within the second internal, cavity to maintain relative positions between the push button and the hook, wherein the hook is configured to disengage the housing in response to depression of the push button.

13. The microwave oven of claim 12, wherein the push button and the hook are configured to collectively pivot about an axis relative to the panel while maintaining the relative positions in response to depression of the push button to disengage the hook from the housing.

14. The microwave oven of claim 12, wherein the push button protrudes outward from an external surface of the handle, into a space defined between the handle and the panel, and toward the panel.

15. The microwave oven of claim 14, wherein the external surface faces toward the panel.

16. The microwave oven of claim 12, wherein the latch includes a plurality of linking arms (i) disposed within the second internal cavity and (ii) rigidly interconnecting the hook to the push button.

17. The microwave oven of claim 16, wherein the hook, push button, and plurality of linking arms form a single solid component.

18. A microwave oven comprising:

a housing defining a first internal cavity configured to receive food for cooking;

a door (i) rotatably secured to the housing, (ii) defining a second internal cavity, and (ii) defining a pocket handle extending upward from a lower edge, wherein the door (i) is configuring to pivot relative to the housing to transition the door between an open position and a closed position, (ii) provides access to the first internal cavity in the open position, (iii) covers the first internal cavity ju the closed position; and a latch disposed within the second internal cavity, the latch having a hook (i) protruding outward from the second internal cavity, beyond an external surface of the door, and toward the housing, (ii) configured to engage the housing to lock the door to the housing in the closed position, and (iii) configured to disengage the housing to unlock the door from the housing, and a push button (i) extending downward into the pocket handle and (ii) rigidly interconnected to the hook within the second internal-cavity, cavity to maintain relative positions between the push button and the hook, wherein the hook is configured to disengage the housing in response to depression of the push button.

19. The microwave oven of claim 18, wherein the push button and the hook are configured to collectively pivot about an axis relative to the door while maintaining the relative positions in response to depression of the push button to disengage the latch hook from the housing.

20. The microwave oven of claim 19, wherein the latch includes a plurality of linking arms (i) disposed within the second internal cavity and (ii) rigidly interconnecting the hook to the push button.

* * * * *